(12) United States Patent
Gao et al.

(10) Patent No.: US 12,462,797 B2
(45) Date of Patent: Nov. 4, 2025

(54) RENDERING RESPONSES TO A SPOKEN UTTERANCE OF A USER UTILIZING A LOCAL TEXT-RESPONSE MAP

(71) Applicant: Google LLC, Mountain View, CA (US)

(72) Inventors: Yuli Gao, Sunnyvale, CA (US); Sangsoo Sung, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 573 days.

(21) Appl. No.: 17/118,463

(22) Filed: Dec. 10, 2020

(65) Prior Publication Data

US 2021/0097999 A1 Apr. 1, 2021

Related U.S. Application Data

(63) Continuation of application No. 16/609,403, filed as application No. PCT/US2018/039850 on Jun. 27, 2018, now Pat. No. 10,891,958.

(51) Int. Cl.
*G06F 3/16* (2006.01)
*G06F 40/35* (2020.01)
(Continued)

(52) U.S. Cl.
CPC ............. *G10L 15/22* (2013.01); *G06F 3/167* (2013.01); *G10L 15/26* (2013.01); *G10L 15/30* (2013.01); *G06F 40/35* (2020.01)

(58) Field of Classification Search
CPC ......... G06F 40/35; G06F 3/167; G10L 15/22; G10L 15/30; G10L 15/26
See application file for complete search history.

(56) References Cited

U.S. PATENT DOCUMENTS

| 6,295,535 B1 * | 9/2001 | Radcliffe ................ G06F 30/00 707/999.005 |
| 7,240,094 B2 * | 7/2007 | Hackney ............... G06F 16/951 715/205 |

(Continued)

FOREIGN PATENT DOCUMENTS

| CN | 1735929 A * | 2/2006 | ............. G10L 15/26 |
| CN | 102629246 | 8/2012 | |

(Continued)

OTHER PUBLICATIONS

Japanese Patent Office; Notice of Allowance issued in Application No. 2020-569950; 3 pages; dated Jun. 21, 2021.

(Continued)

*Primary Examiner* — Paras D Shah
*Assistant Examiner* — Oluwadamilola M Ogunbiyi
(74) *Attorney, Agent, or Firm* — Gray Ice Higdon

(57) ABSTRACT

Implementations disclosed herein relate to generating and/or utilizing, by a client device, a text-response map that is stored locally on the client device. The text-response map can include a plurality of mappings, where each of the mappings define a corresponding direct relationship between corresponding text and a corresponding response. Each of the mappings is defined in the text-response map based on the corresponding text being previously generated from previous audio data captured by the client device and based on the corresponding response being previously received from a remote system in response to transmitting, to the remote system, at least one of the previous audio data and the corresponding text.

18 Claims, 6 Drawing Sheets

(51) Int. Cl.
*G10L 15/22* (2006.01)
*G10L 15/26* (2006.01)
*G10L 15/30* (2013.01)

(56) References Cited

U.S. PATENT DOCUMENTS

| | | | | |
|---|---|---|---|---|
| 8,117,531 | B1* | 2/2012 | Lueck | G06F 40/58 |
| | | | | 715/204 |
| 8,311,835 | B2* | 11/2012 | Lecoeuche | H04M 1/72445 |
| | | | | 704/270.1 |
| 8,868,409 | B1 | 10/2014 | Mengibar et al. | |
| 8,972,180 | B1* | 3/2015 | Zhao | G01C 21/20 |
| | | | | 701/468 |
| 9,124,472 | B1* | 9/2015 | Schneider | H04L 69/329 |
| 9,300,761 | B2* | 3/2016 | Ryu | H04L 67/1097 |
| 9,679,568 | B1* | 6/2017 | Taubman | G10L 15/22 |
| 10,235,999 | B1 | 3/2019 | Naughton et al. | |
| 10,388,277 | B1 | 8/2019 | Ghosh et al. | |
| 10,777,203 | B1* | 9/2020 | Pasko | G10L 15/18 |
| 10,891,958 | B2 | 1/2021 | Gao et al. | |
| 2007/0179789 | A1 | 8/2007 | Bennett | |
| 2008/0104043 | A1* | 5/2008 | Garg | G06F 16/24534 |
| 2008/0115141 | A1* | 5/2008 | Welingkar | G06F 11/1464 |
| | | | | 718/104 |
| 2008/0244556 | A1 | 10/2008 | Plante et al. | |
| 2009/0192968 | A1* | 7/2009 | Tunstall-Pedoe | G06N 5/02 |
| | | | | 706/53 |
| 2010/0005081 | A1 | 1/2010 | Bennett | |
| 2011/0106617 | A1* | 5/2011 | Cooper | G06Q 30/02 |
| | | | | 707/E17.014 |
| 2011/0106966 | A1* | 5/2011 | Smit | G06F 16/3331 |
| | | | | 709/231 |
| 2011/0307435 | A1* | 12/2011 | Overell | G06F 16/367 |
| | | | | 706/46 |
| 2012/0179469 | A1 | 7/2012 | Newman | |
| 2012/0265531 | A1* | 10/2012 | Bennett | G06F 40/42 |
| | | | | 704/E15.005 |
| 2013/0006626 | A1* | 1/2013 | Aiyer | G06F 21/32 |
| | | | | 704/235 |
| 2013/0326384 | A1* | 12/2013 | Moore | G01C 21/3664 |
| | | | | 715/771 |
| 2013/0326407 | A1* | 12/2013 | van Os | G06T 19/00 |
| | | | | 715/810 |
| 2014/0122059 | A1 | 5/2014 | Patel et al. | |
| 2014/0195230 | A1* | 7/2014 | Han | G10L 15/22 |
| | | | | 704/235 |
| 2014/0250195 | A1 | 9/2014 | Capper et al. | |
| 2014/0280169 | A1* | 9/2014 | Liu | G10L 15/1815 |
| | | | | 707/739 |
| 2014/0370920 | A1* | 12/2014 | Caillette | G06F 16/29 |
| | | | | 455/456.3 |
| 2015/0058488 | A1 | 2/2015 | Backholm | |
| 2015/0084770 | A1* | 3/2015 | Xiao | G08B 25/016 |
| | | | | 340/540 |
| 2015/0095267 | A1* | 4/2015 | Behere | G06F 16/3329 |
| | | | | 706/11 |
| 2015/0170653 | A1 | 6/2015 | Berndt et al. | |
| 2015/0187232 | A1* | 7/2015 | Bailiang | G09B 29/007 |
| | | | | 701/532 |
| 2015/0248464 | A1* | 9/2015 | Desai | G06F 16/24568 |
| | | | | 707/724 |
| 2015/0279352 | A1 | 10/2015 | Willett et al. | |
| 2015/0310755 | A1 | 10/2015 | Haverlock et al. | |
| 2015/0341486 | A1 | 11/2015 | Knighton | |
| 2016/0110415 | A1* | 4/2016 | Clark | G06F 16/24535 |
| | | | | 707/774 |
| 2016/0262017 | A1 | 9/2016 | Lavee et al. | |
| 2016/0275075 | A1* | 9/2016 | Yu | G06F 40/30 |
| 2016/0292204 | A1 | 10/2016 | Klemm et al. | |
| 2016/0350320 | A1 | 12/2016 | Sung et al. | |
| 2017/0004204 | A1 | 1/2017 | Bastide et al. | |
| 2017/0083969 | A1* | 3/2017 | Takeda | G06F 16/951 |
| 2017/0192976 | A1 | 7/2017 | Bhatia et al. | |
| 2017/0235825 | A1 | 8/2017 | Gordon | |
| 2017/0236519 | A1 | 8/2017 | Jung et al. | |
| 2018/0092189 | A1* | 3/2018 | Reier | G10L 15/30 |
| 2018/0122366 | A1 | 5/2018 | Nishikawa | |
| 2018/0131645 | A1* | 5/2018 | Magliozzi | G06F 40/30 |
| 2018/0150739 | A1 | 5/2018 | Wu | |
| 2018/0255180 | A1 | 9/2018 | Goldberg et al. | |
| 2018/0301148 | A1 | 10/2018 | Roman et al. | |
| 2018/0341643 | A1* | 11/2018 | Alders | G10L 15/1822 |
| 2019/0027130 | A1* | 1/2019 | Tsunoo | G06F 40/242 |
| 2019/0066696 | A1 | 2/2019 | Mu et al. | |
| 2019/0129688 | A1* | 5/2019 | Yao | G10L 15/08 |
| 2019/0129938 | A1* | 5/2019 | Yao | H04L 12/282 |
| 2019/0173913 | A1 | 6/2019 | Kras | |
| 2019/0173914 | A1 | 6/2019 | Irimie et al. | |
| 2019/0222555 | A1 | 7/2019 | Skinner et al. | |
| 2019/0279620 | A1 | 9/2019 | Talwar et al. | |
| 2019/0295552 | A1* | 9/2019 | Pasko | G10L 15/30 |
| 2019/0310804 | A1* | 10/2019 | Fukuda | G06F 11/0766 |
| 2019/0312973 | A1 | 10/2019 | Engelke et al. | |
| 2019/0354630 | A1* | 11/2019 | Guo | G10L 15/08 |
| 2019/0371314 | A1 | 12/2019 | Naughton et al. | |
| 2019/0392037 | A1 | 12/2019 | Guo et al. | |
| 2020/0218767 | A1 | 7/2020 | Ritchey et al. | |
| 2020/0220935 | A1* | 7/2020 | Bao | G10L 17/22 |
| 2021/0097236 | A1* | 4/2021 | Fujimoto | G06F 40/216 |

FOREIGN PATENT DOCUMENTS

| | | | | |
|---|---|---|---|---|
| CN | 103247291 | | 8/2013 | |
| CN | 103295575 | | 9/2013 | |
| CN | 105261366 | | 1/2016 | |
| CN | 105793923 | | 7/2016 | |
| CN | 106796496 | | 5/2017 | |
| CN | 107660303 | | 2/2018 | |
| CN | 108010523 | | 5/2018 | |
| CN | 108170034 | | 6/2018 | |
| JP | 3960188 | B2 * | 8/2007 | |
| JP | 2007527640 | | 9/2007 | |
| JP | 2013205524 | | 10/2013 | |
| JP | 2013207726 | A * | 10/2013 | |
| JP | 2014071449 | | 4/2014 | |
| JP | 2015015675 | A * | 1/2015 | |
| JP | 2015106203 | | 6/2015 | |
| JP | 2017072725 | | 4/2017 | |
| JP | 2012501480 | | 1/2018 | |
| KR | 20060070605 | | 6/2006 | |
| KR | 20130086971 | | 8/2013 | |
| WO | 2005006116 | | 1/2005 | |
| WO | WO-2012167276 | A1 * | 12/2012 | G06F 16/685 |
| WO | 2014051207 | | 4/2014 | |
| WO | 2016122902 | | 8/2016 | |
| WO | 2017146803 | | 8/2017 | |
| WO | WO-2018016669 | A2 * | 1/2018 | G06F 21/562 |
| WO | 2017141502 | | 11/2018 | |
| WO | 2020005241 | | 1/2020 | |

OTHER PUBLICATIONS

European Patent Office; Communication Issued in Application No. 20195601.8; 10 pages; dated Feb. 17, 2021.

Intellectual Property India; Examination Report issued in Application No. 202027052364; 7 pages; dated Dec. 10, 2022.

European Patent Office; Intention to Grant issued in Application No. 18743935.1; 46 pages; dated Feb. 18, 2020.

European Patent Office; Commincation under Rule 71(3) EPC issued in Application No. 18743935.1; 46 pages; dated Apr. 30, 2020.

International Search Report and Written Opinion issued is Application No. PCT/US2018/039850 dated Feb. 25, 2019.

Japanese Patent Office; Notice of Reasons for Rejection issued in app. No. 2021-118613, 11 pages, dated Aug. 22, 2022.

European Patent Office; Communication pursuant to Article 94(3) issued in Application No. 20195601.8, 5 pages, dated Aug. 24, 2022.

(56) References Cited

OTHER PUBLICATIONS

Korean Intellectual Property Office; Notice of Office Action issued in Application Ser. No. KR10-2020-7037198; 13 pages; dated Aug. 18, 2022.
Korean Intellectual Property Office; Notice of Allowance issued for Application No. 10-2020-7037198, 4 pages, dated Jan. 2, 2023.
European Patent Office; Intention to Grant issued in Application No. 20195601.8, 73 pages, dated Apr. 26, 2023.
Korean Intellectual Property Office; Notice of Office Action issued in Application Ser. No. KR10-2023-7010851; 6 pages; dated May 25, 2023.
Korean Intellectual Property Office: Notice of Allowance issued for Application No. 10-2023-7010851, 5 pages, dated Sep. 5, 2023.
China National Intellectual Property Administration; Notice of Grant issued in Application No. 201880094598.1; 4 pages; dated Apr. 25, 2024.
China National Intellectual Property Administration; Notification of First Office Action issued in Application No. 201880094598.1; 31 pages; dated Dec. 1, 2023.
Intellectual Property India; Hearing Notice issued for Application No. 202027052364, 2 pages, dated Mar. 11, 2024.

* cited by examiner

RENDERING RESPONSES TO A SPOKEN UTTERANCE OF A USER UTILIZING A LOCAL TEXT-RESPONSE MAP

BACKGROUND

Voice-based user interfaces are increasingly being used in the control of computers and other electronic devices. One particularly useful application of a voice-based user interface is with portable electronic devices such as mobile phones, watches, tablet computers, head-mounted devices, virtual or augmented reality devices, etc. Another useful application is with vehicular electronic systems such as automotive systems that incorporate navigation and audio capabilities. Such applications are generally characterized by non-traditional form factors that limit the utility of more traditional keyboard or touch screen inputs and/or usage in situations where it is desirable to encourage a user to remain focused on other tasks, such as when the user is driving or walking.

Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces incorporate both an initial speech-to-text conversion that converts an audio recording of a human voice to text, and a semantic analysis that analysis the text in an attempt to determine the meaning of a user's request. Based upon a determined meaning of a user's recorded voice, an action may be undertaken such as performing a search or otherwise controlling a computer or other electronic device.

A user may submit queries and/or commands to a client device via a spoken utterance, verbally indicating what information the user has interest in being provided and/or an action that the user has interest in being performed. Typically, the spoken utterance is detected by microphone(s) of the client device and captured as audio data. The audio data is transmitted to a remote system for further processing. The remote system processes the audio data to determine an appropriate response, and transmits the response to the client device for rendering by the client device.

Processing of audio data by a remote system can include using a speech-to-text (STT) component to generate text based on the audio data, where the generated text reflects a spoken utterance captured by the audio data. The processing can further include processing the generated text using a natural language processor (NLP) and/or other semantic processor, in an attempt to determine the meaning or intent of the text—and an action to be performed based on the determined meaning. The action can then be performed to generate a corresponding response, and the corresponding response transmitted to the client device from which the audio data was received.

Components of a remote system can devote substantial computing resources to processing audio data, enabling more complex speech recognition and semantic analysis functionality to be implemented than could otherwise be implemented locally within a client device. However, a client-server approach necessarily requires that a client be online (i.e., in communication with the remote systems) when processing voice input. In various situations, continuous online connectivity may not be guaranteed at all times and in all locations, so a client-server voice-based user interface may be disabled in a client device whenever that device is "offline" and thus unconnected to an online service.

Further, a client-server approach can consume significant bandwidth, as it requires transmission of high-bandwidth audio data from a client to components of a remote system. The consumption of bandwidth is amplified in the typical situations where the remote system is handling requests from a large quantity of client devices. Yet further, a client-server approach can exhibit significant latency in rendering of responses to a user, which can cause voice-based user-client interactions to be protracted, and resources of the client device to be utilized for a protracted duration. The latency of the client-server approach can be the result of transmission delays, and/or delays in the voice-to-text processing, semantic processing, and/or response generation performed by remote system. Yet further, exchange of messages between client and server in a client-server approach may require a relatively significant amount of power consumption for the transmission and reception of the messages. The effect of this may be particularly felt by the client device, whose available power is often provided by on-device batteries with relatively limited storage capacity.

SUMMARY

Implementations disclosed herein relate to generating and/or utilizing, by a client device, a text-response map that is stored locally on the client device. The text-response map can include a plurality of mappings, where each of the mappings define a corresponding direct relationship between corresponding text and a corresponding response. Each of the mappings is defined in the text-response map based on the corresponding text being previously generated from previous audio data captured by the client device and based on the corresponding response being previously received from a remote system in response to transmitting, to the remote system, at least one of the previous audio data and the corresponding text.

When a spoken utterance is detected by the client device, the client device can utilize a local voice-to-text/speech-to-text (STT) model to generate text that corresponds to the spoken utterance. The client device can then determine whether the generated text matches any of the corresponding texts of the text-response map. If so, and optionally if one or more other conditions are satisfied (e.g., condition(s) based on a confidence score described herein), the client device can utilize a corresponding mapping of the text-response map to select the response that has the direct relationship to the corresponding text, as defined by the corresponding mapping. The client device can then immediately render the response, from its local memory, via one or more output devices of the client device (e.g., speaker(s) and/or display(s)). The response is rendered responsive to the spoken utterance, and rendering the response can include rendering text of the response, graphic(s) of the response, audio data of the response (or audio data converted from the response using a locally stored text-to-speech (TTS) processor), and/or other content. The response can additionally or alternatively include a command to be transmitted by the client device, such as a command transmitted (e.g., via WiFi and/or Bluetooth) to one or more peripheral devices to control the peripheral device(s). As explained below, having determined that the text generated by the local voice-to-text/speech-to-text (STT) matches any of the corresponding texts of the text-response map, the response may be provided by the client device without the client device needing to transmit data indicative of the detected spoken utterance to the remote system.

In these and other manners, the client device can render the response without necessitating performance of, and/or without awaiting performance of, local and/or remote resource intensive and latency inducing: semantic processing of the text to determine a meaning or intent of the text; and generation of the response based on the determined meaning or intent. Accordingly, when the generated text matches one of the corresponding texts of the text-response map, the response that has the direct relationship to the text (as defined by a corresponding mapping of the text-response map) can be rendered with reduced latency and/or with reduced resource consumption. Moreover, in various situations the response can be rendered without bandwidth consuming transmission, to a remote system, of audio data (that captures the spoken utterance) or text generated based on the audio data. This may further improve the battery-life of the client device, or otherwise free-up power resources for other tasks at the client device, as power-intensive transmission and reception of messages to/from the remote system is reduced.

In some implementations, a method is provided that includes the steps of the client device capturing audio data of a spoken utterance of the user and processing the audio data to generate text. In such implementations, the STT processing is performed locally on the client device and does not require that the audio data be submitted to the cloud. Next, a text-response mapping is accessed, which includes text mapped to responses. This mapping is constructed based on prior texts generated from audio data of prior spoken utterances of the user mapped to the responses that were received from the remote system when the audio data was previously submitted. The client device then determines whether the text-response mapping includes a text mapping for the generated text. In response to determining that the text-response mapping includes a text mapping that matches the text, the mapped response for that text mapping is selected and rendered by the client device.

If the text is not included in the mapping, the audio data (and/or client-device generated text that corresponds to the audio data) is submitted to the remote system for further processing. STT and/or NLP is performed by the remote system to determine an action that corresponds to the spoken utterance, the generated action is utilized to generate a response, and the response is provided to the client device. The client device can then render the response as well as store the generated text with the response. When the user subsequently submits the same spoken utterance, the client device can locally process the audio data to generate corresponding text, check that the text is included in the mapping, and render the mapped response without requiring NLP processing and submission to the server. Thus, not only does the local mapping on the client device save computational time, the method may be performed offline if the mapping already includes the text.

In some instances, responses are dynamic and may result in different responses for the same spoken utterances. For example, a spoken utterance of "What time is it right now" is a dynamic query which varies each time it is submitted. Other examples of dynamic queries include weather, queries related to the location of the user, and other queries that are time-sensitive. On the other hand, some queries can be static and rarely, if ever, result in a different response for a given utterance. For example, "What is the capital of the United States" will always result in the same response regardless of when the utterance is submitted. In some instances, a response may be static for a given period of time and then expire. For example, "What is the weather today" will likely remain static for the duration of the day and subsequently expire at a given time, such as at midnight.

In some implementations, to assist in keeping mapped responses for texts stored locally on the client device fresh, the client device may submit the audio data or other data indicative of the spoken utterance, such as client-device generated text that corresponds to the audio data, to the remote system even when the text is identified in the mapping. The client device can provide the mapped response and once a response is received from the remote system, the received response can be checked with the mapped response. If the mapped response matches the received response, the client device can update the mapping to reflect that the response is static. For example, a confidence score that is associated with each text mapping may be updated to reflect that the same response was received as is stored in the mapping. If a different response was received, the confidence score may be updated to reflect that the stored and received responses do not match. For example, in some instances, if the responses do not match, the text mapping may be removed to ensure that the stale response is not provided to the user subsequently. In some instances, the mapping may be flagged as stale without removing the text mapping. In some instances, the mapped response may be provided only if the confidence score associated with the mapping satisfies a threshold. For example, the server response may be provided a requisite number of times (with each server response being the same) before the confidence score for the mapped response reaches a level at which the mapped response is provided in lieu of providing the audio data, or other data indicative of the spoken utterance, to the remote system. Optionally, when the confidence score satisfies the threshold the client device may automatically not transmit the audio data, or other data indicative of the spoken utterance, to the remote system. Alternatively, in implementations where the client device does transmit the audio data, or other data indicative of the spoken utterance, to the remote system, the client device may provide the mapped response from its local memory before receiving a reply from the remote system.

In some implementations, a method implemented by one or more processors of a client device is provided and includes capturing, via at least one microphone of the client device, audio data that captures a spoken utterance of a user. The method further includes processing the audio data to generate current text that corresponds to the spoken utterance. Processing the audio data to generate the current text utilizes a voice-to-text model stored locally on the client device. The method further includes accessing a text-response map stored locally on the client device. The text-response map includes a plurality of mappings, where each of the mappings define a corresponding direct relationship between corresponding text and a corresponding response based on the corresponding text being previously generated from previous audio data captured by the client device and based on the corresponding response being previously received from a remote system in response to transmitting, to the remote system, at least one of the previous audio data and the corresponding text. The method further includes determining whether any of the corresponding texts of the text-response map matches the current text. The method further includes, in response to determining that a given text, of the corresponding texts of the text-response map, matches the current text: selecting a given response of the corresponding responses of the text-response map, and causing the given response to be rendered via one or more user interface output devices associated with the client device.

Selecting the given response is based on the text-response map including a mapping, of the mappings, that defines the given response as having a direct relationship with the given text.

These and other implementations of the technology can include one or more of the following features.

In some implementations, the method further includes: transmitting the audio data or the current text to the remote system; receiving, from the remote system in response to transmitting the audio data or the current text, a server response that is responsive to the spoken utterance; comparing the server response to the given response; and updating the text-response map based on the comparison. In some versions of those implementations, receiving the server response occurs after at least part of the given response has been rendered via the one or more user interface output devices. In some additional or alternative versions of those implementations, comparing the server response to the given response indicates that the server response differs from the given response. In some of those additional or alternative versions, updating the text-response map includes, based on the comparison indicating that the server response differs from the given response: updating the mapping, that defines the given response as having the direct relationship with the given text, to define the server response as having the direct relationship with the given text. In some of those additional or alternative versions, updating the text-response map includes, based on the comparison indicating that the server response differs from the given response: removing, from the text-response map, the mapping that defines the given response as having the direct relationship with the given text. In some of those additional or alternative versions, updating the text-response map includes, based on the comparison indicating that the server response differs from the given response: storing, in the text-response map, data that prevents the given text from being mapped to any responses.

In some implementations that include updating the text-response map, updating the text-response map includes adjusting a confidence score associated with the mapping that defines the given response as having the direct relationship with the given text. In some versions of those implementations, adjusting the confidence score associated with the mapping that defines the given response as having the direct relationship with the given text includes: adjusting the confidence score to be more indicative of confidence if the comparison indicates the given response matches the server response. In some additional or alternative versions of those implementations, selecting the given response is further based on the confidence score associated with the mapping satisfying a threshold.

In some implementations, the method further includes: capturing, via the at least one microphone of the client device, additional audio data that captures an additional spoken utterance; processing, utilizing the voice-to-text model stored locally on the client device, the additional audio data to generate additional text that corresponds to the additional spoken utterance; determining whether any of the corresponding texts of the text-response map matches the additional text; and in response to determining that none of the corresponding texts of the text-response map matches the additional text: transmitting at least one of the additional text and the additional audio data to the server system, receiving, from the server system in response to transmitting the at least one of the additional text and the additional audio data, an additional response, and causing the additional response to be rendered via one or more of the user interface output devices associated with the client device. In some of those implementations, the method further includes: receiving, from the server system with the additional response, an indication that the server response is a static response for the additional text; and in response to receiving the indication that the server response is a static response for the additional text: adding, to the text-response map, a new mapping that defines a new direct relationship between the additional text and the additional response.

In some implementations, the client device lacks any connection to the Internet when the method is performed.

In some implementations, the method further includes determining a confidence score associated with the mapping that defines the given response as having the direct relationship with the given text. In some of those implementations, causing the given response to be rendered includes: causing, in response to the confidence score satisfying a threshold, the given response to be rendered without transmitting the audio data or the current text to the remote system.

In some implementations, the method further includes: transmitting, prior to the given response being rendered, the audio data or the current text to the remote system; determining a confidence score associated with the mapping that defines the given response as having the direct relationship with the given text; and determining, based on the confidence score, a threshold amount of time to await receiving, from the remote system in response to transmitting the audio data or the current text, a server response that is responsive to the spoken utterance. In some of those implementations, causing the given response to be rendered includes: causing the given response to be rendered at expiration of the threshold amount of time when the server response is not received before expiration of the threshold amount of time.

In some implementations, a method implemented by one or more processors of a client device is provided and includes: capturing, via at least one microphone of the client device, audio data that captures a spoken utterance of a user; and processing the audio data to generate current text that corresponds to the spoken utterance. Processing the audio data to generate the current text utilizes a voice-to-text model stored locally on the client device. The method further includes accessing a text-response map stored locally on the client device. The text-response map includes a plurality of mappings, and each of the mappings define a corresponding direct relationship between corresponding text and a corresponding response based on the corresponding text being previously generated from previous audio data captured by the client device and based on the corresponding response being previously received from a remote system in response to transmitting, to the remote system, at least one of the previous audio data and the corresponding text. The method further includes: determining, by the client device, that the corresponding texts of the text-response map fail to match the current text; transmitting, to a remote system, the audio data or the current text; receiving, from the remote system in response to submitting the audio data or the current text, a response; and updating the text-response map by adding a given text mapping. The given text mapping defines a direct relationship between the current text and the response. The method further includes: capturing, subsequent to updating the text-response map, second audio data; processing the second audio data to generate a second text utilizing the voice-to-text model stored locally on the client device; determining, based on the text-response map, that the current text matches the second text; and in response to determining that the current text matches the second text, and based on the text-response map including the given text mapping that defines the direct relationship between the current text and the response: causing the response to be rendered via one or more user output devices associated with the client device.

These and other implementations of the technology can optionally include one or more of the following features.

In some implementations, the method further includes receiving, with the response, an indication of whether the response is static. In some of those implementations: adding the given text mapping to the text-response map occurs in response to the indication indicating that the response is static.

In some implementations, updating the text-response map further includes storing a confidence score in association with the given text mapping, where the confidence score is indicative of likelihood that the response is static. In some of those implementations, the method further includes: submitting the second audio data to the remote system; receiving, in response to submitting the second audio data, a second server response from the remote system; and further updating the confidence score based on the second server response.

In some implementations, the method further includes: receiving, with the response, an indication that the response is static only until an expiration event occurs; updating the text-response map to include an indication of the expiration event with the given text mapping; and removing the given text mapping from the text-response map when the expiration event occurs.

In some implementations, updating the text-response map includes removing one or more mappings from the text-response map.

Some implementations include a computing apparatus including one or more processors and at least one memory storing computer-executable instructions which, when executed by the one or more processors, causes the one or more processors to perform a method, such as a method described above or elsewhere herein. The computing apparatus can be, for example, a client device. The one or more processors can include, for example, central processing unit(s), graphics processing unit(s), and/or tensor processing unit(s). Some implementations include a non-transitory computer readable medium including computer-executable instructions which, when executed by one or more processors of at least one computing apparatus, cause a method to be performed, such as a method described above or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, a semantic processor of a voice-enabled client device utilizes a text-response map stored locally on the client device to parse spoken utterances received by the device. In some implementations, the text-response map is generated based on previous spoken utterances received by the device and one or more responses received from a cloud-enabled device. In instances where the text-response map does not include a text corresponding to the received spoken utterance, the device can provide audio data that captures the spoken utterance (and/or a text representation of the spoken utterance generated by the client device) to the cloud-based device, which may then perform further analysis, determine a response, and provide the response to the client device for rendering by one or more interfaces of the device. The response can then be stored with text in the text-response mapping stored locally on the client device and utilized to identify a response upon future instances of receiving the same spoken utterance. As outlined above and explained further below, this can lead to more efficient use of hardware resources in a network involving the client device and the remote, cloud-enabled device.

Further details regarding selected implementations are discussed hereinafter. It will be appreciated however that other implementations are contemplated so the implementations disclosed herein are not exclusive.

Figure 1:
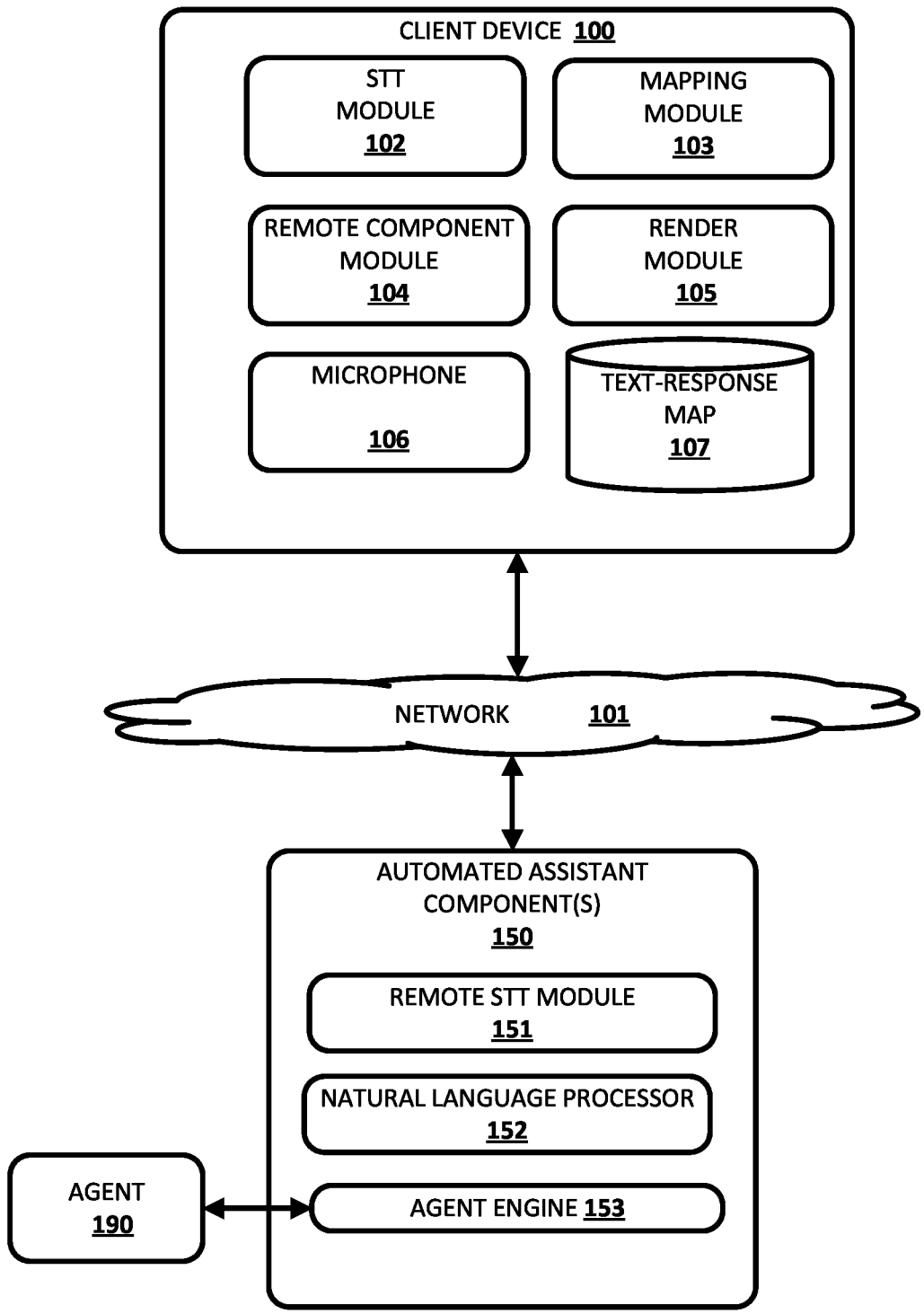
FIG. 1 illustrates an example environment in which techniques described herein can be implemented.

Referring to FIG. 1, an example environment in which techniques described herein can be implemented is illustrated. The example environment includes a client device 100 and a remote system 150. The client device 100 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided. Components of client device 100 and components of remote system 150 can communicate via communication network 101. Communication network 101 may include, for example, a wide area network (WAN) (e.g., the Internet). Further, components of client device 100 may communicate with one or more other components via communication network 101. For example, communication network 101 may include a local area network (LAN) and/or BLUETOOTH, and may communicate with one or more other devices via the LAN and/or BLUETOOTH.

Client device 100 includes one or more microphones 106 that may capture audio data indicative of one or more spoken utterances of a user. The microphone 106 may then provide the audio data to one or more other components of client device 100 and/or remote system 150 for further processing.

Client device 100 may include a number of modules suitable for implementing the herein-described methods, including, for example, a speech-to-tech (STT) module 102, a mapping module 103, a remote component module 104 and a render module 105, as well as a text-response map 107 for storing a plurality of text mappings. Likewise, remote system 150 may include a number of modules, including, for example, a remote STT module 151, a natural language processing (NLP) module 152, and an agent engine 153 suitable for interacting with one or more agents 190.

Figure 2:
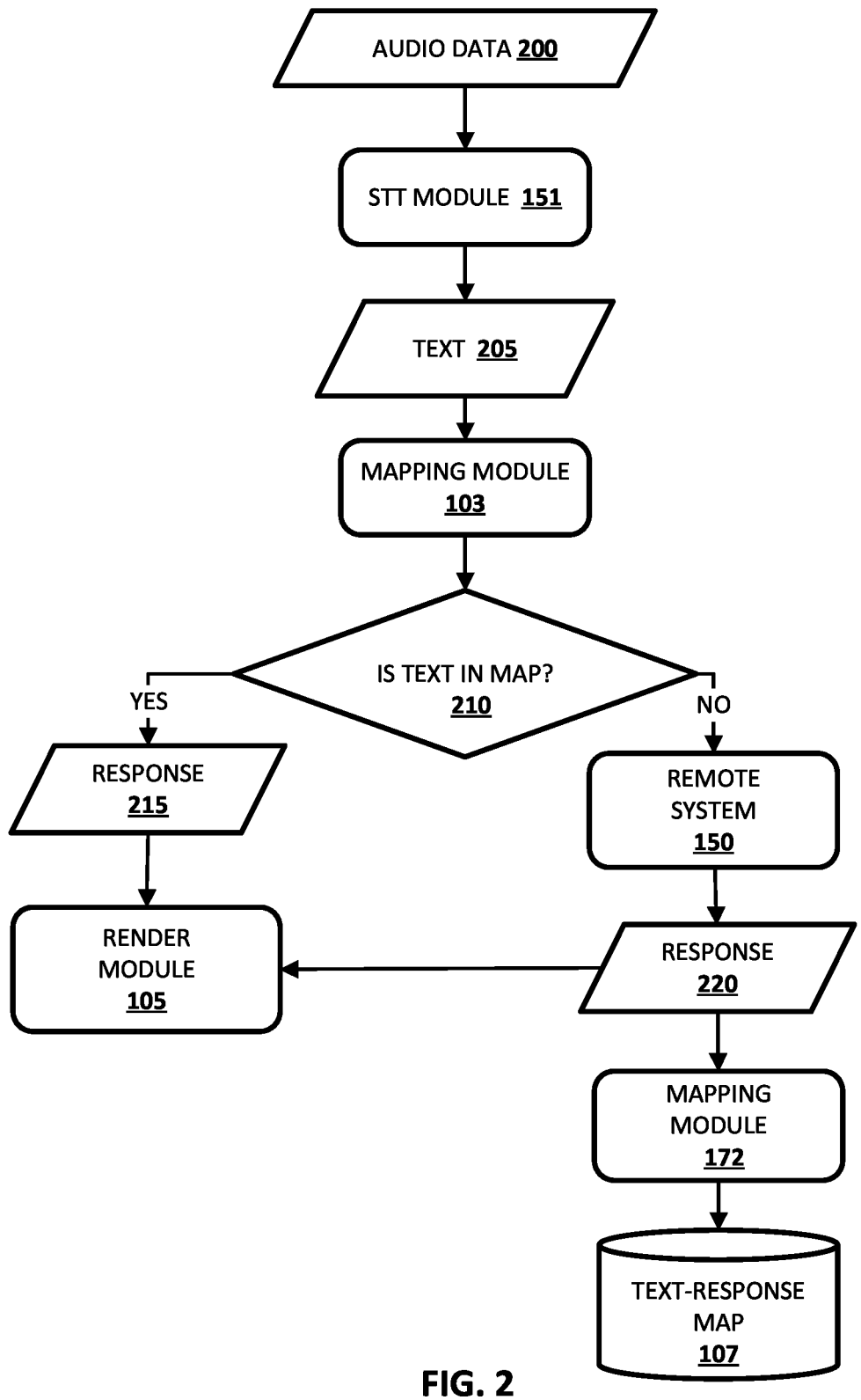
FIG. 2 provides a flowchart that illustrates implementations of methods described herein.

Referring now to FIG. 2, and with continued reference to FIG. 1, a flowchart is provided that illustrates implementations of methods described herein using the various components illustrated in FIG. 1. As illustrated, audio data 200 may be provided to STT module 102. STT module 102 receives audio data 200 and converts the digital audio data into one or more text words or phrases (also referred to herein as tokens). In some implementations, STT module 102 can be a streaming module, such that audio data of captured utterances is converted to text on a token-by-token basis and in real time or near-real time, such that tokens may be output from STT module 102 effectively concurrently with a user's speech, and thus prior to a user enunciating a complete spoken request. STT module 102 may rely on one or more locally-stored offline acoustic and/or language models, which together model a relationship between an audio signal and phonetic units in a language, along with word sequences in the language. In some implementations, a single model may be used, while in other implementations, multiple models may be supported, e.g., to support multiple languages, multiple speakers, etc.

In some instances, audio data 200 and/or text 205 may be provided to remote component module 104. Remote component module 104 communicates with remote system 150 via communication network 101 and may provide the audio data and/or a text representation of the audio data to remote STT module 151 and/or natural language processing (NLP) module 152. Remote STT module 151 can function similar to STT module 102 in that it may receive audio data indicative of a spoken utterance of a user and convert the audio data into text. However, remote STT module 151 does not utilize the resources of client device 100 and instead utilizes the resources of remote system 150. Thus, in some instances, remote STT module 151 may be more robust that STT module 151 because remote system 150 has less constraints on computing power and/or storage than client device 100.

Text generated by STT module 102 and/or by remote STT module 151 may be provided to NLP module 152 for further processing. NLP module 152 processes free form natural language input and generates, based on the natural language input, annotated output for use by one or more other components of the remote system 150. For example, the NLP module 152 can process natural language free-form input that is textual input that is a conversion, by STT module 151 and/or remote STT module 151, of audio data provided by a user via client device 106. Also, for example, NLP module 152 may generate output directly from the audio data 200 received from remote component module 104. The generated annotated output may include one or more annotations of the natural language input and optionally one or more (e.g., all) of the terms of the natural language input.

In some implementations, the NLP module 152 is configured to identify and annotate various types of grammatical information in natural language input. For example, the NLP module 152 may include a part of speech tagger (not depicted) configured to annotate terms with their grammatical roles. Also, for example, in some implementations the NLP module 152 may additionally and/or alternatively include a dependency parser (not depicted) configured to determine syntactic relationships between terms in natural language input.

In some implementations, the NLP module 152 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the NLP module 152 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Identified entities may be utilized to identify patterns in the text, as described herein.

In some implementations, the NLP module 152 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the NLP module 152 may rely on annotations from one or more other components of the NLP module 152. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the NLP module 152 may use related prior input and/or other related data outside of the particular natural language input to determine one or more annotations.

NLP module 152 may then provide the annotated output to agent module 153, which may provide the output to one or more agents 190, which may then determine an appropriate response for the spoken utterance of the user. For example, agent module 153 may determine, based on the annotations of the output of NLP module 152, which agent 190 is most likely to utilize the annotated output and generate a meaningful response. The annotated output of the NLP module 152 can then be provided to that agent and the resulting response from the agent may be provided to the client device 100 for rendering. For example, a spoken utterance of "What is the weather today" may be converted to text, annotated by NLP module 152, and the resulting annotated output may be provided to agent module 153. Agent module 153 may determine, based on the annotation, that a weather agent may likely determine a meaningful response to the annotated output, and provide the output to the weather component. The weather agent may then determine a response to provide to the client device, which may then be rendered by the client device 100 to the user. For example, based on the response of "75, sunny" provided by agent module 153 from a weather agent, rendering module 105 may provide audio and/or visual rendering of the response (e.g., an audio rendering of "The weather will be sunny today and 75" and/or output to a visual interface of the weather). The NLP module 152 may be relatively computationally demanding when processing the text generated by STT module 102 and/or by remote STT module 151. This means that the NLP module's presence at the remote system 150 is advantageous to the client device 100 and system as a whole because, whilst the client device 100 may be computationally capable of implementing the NLP module 152, its overall processing capabilities and power-storage capacity are likely to be more limited than those available at the remote system 150. These factors mean that the NLP module's presence at the remote system 150 keeps latency of response low, particularly where the client device 100 needs to wait for natural language processing in order to provide the response, and keeps general reliability of response high regardless of whether the eventual response is provided from the mapped local storage at the client device or by waiting for a response from the remote system 150.

Once a response has been received by agent module 153 from one or more agents 190, the response may be provided to the client device 100 via remote component module 104. The received response may be provided to rendering module 105, which may then render the action via one or more components (not illustrated). For example, render module 105 may include a text-to-speech component, which may convert the response into speech and provide the audio to the user via one or more speakers of the client device 100. Also, for example, render module 105 may generate a graphical response and provide the graphical response via one or more visual interfaces associated with the client device 100. Also, for example, render module 105 may be in communication with one or more other devices of the user, such as Wi-fi controlled lighting, and may provide the response to the one or more other devices for rendering (e.g., turn on a light).

In some implementations, the server response can be stored in text-response map 107 with the text 200. Text-response map 107 includes texts generated from audio data by STT module 102 and/or remote STT module 151, stored with corresponding responses received from the remote system 150. For example, audio data for a spoken utterance of "Turn on the kitchen light" may be received by STT module 102 and converted to text. The text may be provided to the remote system 150, which may determine an appropriate action for the command (e.g., determine the meaning of the spoken utterance). A resulting response indicative of turning on a light may be received by render module 105, which then can identify a "kitchen light" associated with the client device 100 and turn the light off. The resulting response can then be stored in text-response map 107 with the response (e.g., a response of turning off a particular light) for later utilization by the client device 100.

In some implementations, the text-response map may be stored as one or more tables in a database, as a stack (e.g., a last-in first-out data structure), as a queue (e.g., a first-in first-out data structure), and/or one or more alternative data structures. As described herein, the text can be stored in an alphanumerical format. However, the text may alternatively be stored as one or more matrices of phonemes, as audio data, and/or any other format that allows mapping module 103 to compare audio data captured by the client device 100 with text stored in the text-response map. The responses stored in the text-response module may be stored as a textual response, an action to be performed by one or more interfaces of the user, and/or one or more alternative formats that can be provided to one or more interfaces for rendering to the user.

The text and response are stored in the text-response map with a direct relationship such that each text is associated with a particular response. For example, the text "What is the capital of France" can be stored with a response of "Paris" and with no other responses. Also, for example, the text "Turn on the kitchen light" can be stored with a direct relationship with a command that can be provided to a lighting device of the user to turn on the device.

In some instances, the text and response may already be stored in the text-response map 107. For example, the user may have already spoken the utterance "Turn off the kitchen light" and the resulting response may have already been stored with the text. In those instances, mapping module 103 can verify that the result received from the remote system 150 matches the response stored in the text-response map. Mapping module 103 may update the text-response map 107 based on checking whether the stored response matches the response received from the remote system 150.

Referring again to FIG. 2, mapping module 103 can access the text-response map 107 to determine whether the generated text 205 has been previously stored, as described above. At decision 210, if a text mapping for text 205 is not identified in the text-response mapping 107, the text (or the audio data) is provided to the remote system 150 and a response 220 is received from the remote server 150, as previously described. The response 220 can then be rendered by render module 105 and further provided to mapping module 103, which then generates a text mapping based on the text 205 and the response 220. The text mapping can then be stored in text-response map 107.

If the mapping module 103 determines at decision 210 that text-response map 107 includes a text mapping for the text 205, the mapping module 103 accesses the text-response map 107, identifies the response 215 associated with the text 205, and provides the response 215 to render module 105 for rendering to the user. Thus, in instances where a spoken utterance of the user has already been processed by the remote system 150 and stored in the text-response map 107, the remote system 150 does not need to be accessed to render content to the user. Because all actions occur on the client device 100, any latency introduced by communication network 101 and/or by components of remote system 150 is eliminated. Furthermore, overall power consumption is reduced due to the fact that the remote system 150 does not need to be accessed by the client device 100. Further, because natural language processing and determining a response are eliminated, local and/or remote computation resources are saved when a user submits the same utterance repeatedly. Still further, because the response can be rendered without utilizing the remote system 150, the response can be rendered even when the client device 100 lacks any connection to the remote system 150, such as an Internet connection.

In some instances, a response can be a static response that does not change between repeated requests by a user. For example, a spoken utterance of "Who was the first president of the United States" will result in the same response each time the utterance is received. However, in some instances, responses can be dynamic and may change upon receiving the same spoken utterance. For example, "What restaurants are near me" will change with the location of the user and is therefore a dynamic response. Also, for example, "What is the weather tomorrow" is dynamic in that the weather predictions may change throughout the day and further, "tomorrow" describes a particular day for a limited amount of time (i.e., only when the utterance is received "today").

In some implementations, remote component module 104 provides the text 205 and/or the audio data 200 to remote system 150 even when mapping module 103 identifies a text mapping for text 200 in the text-response map 107. This can occur, for example, before the render module 105 is provided the corresponding response of the text mapping or render module 105 may be provided the response (and start the rendering of the response) before receiving a server response. In some implementations, mapping module 103 may wait a threshold amount of time after remote component engine 104 provides the text and/or audio data and only provide the render module 105 with the locally stored response if a response is not received from the remote system 150 before expiration of the threshold time.

Figure 3:
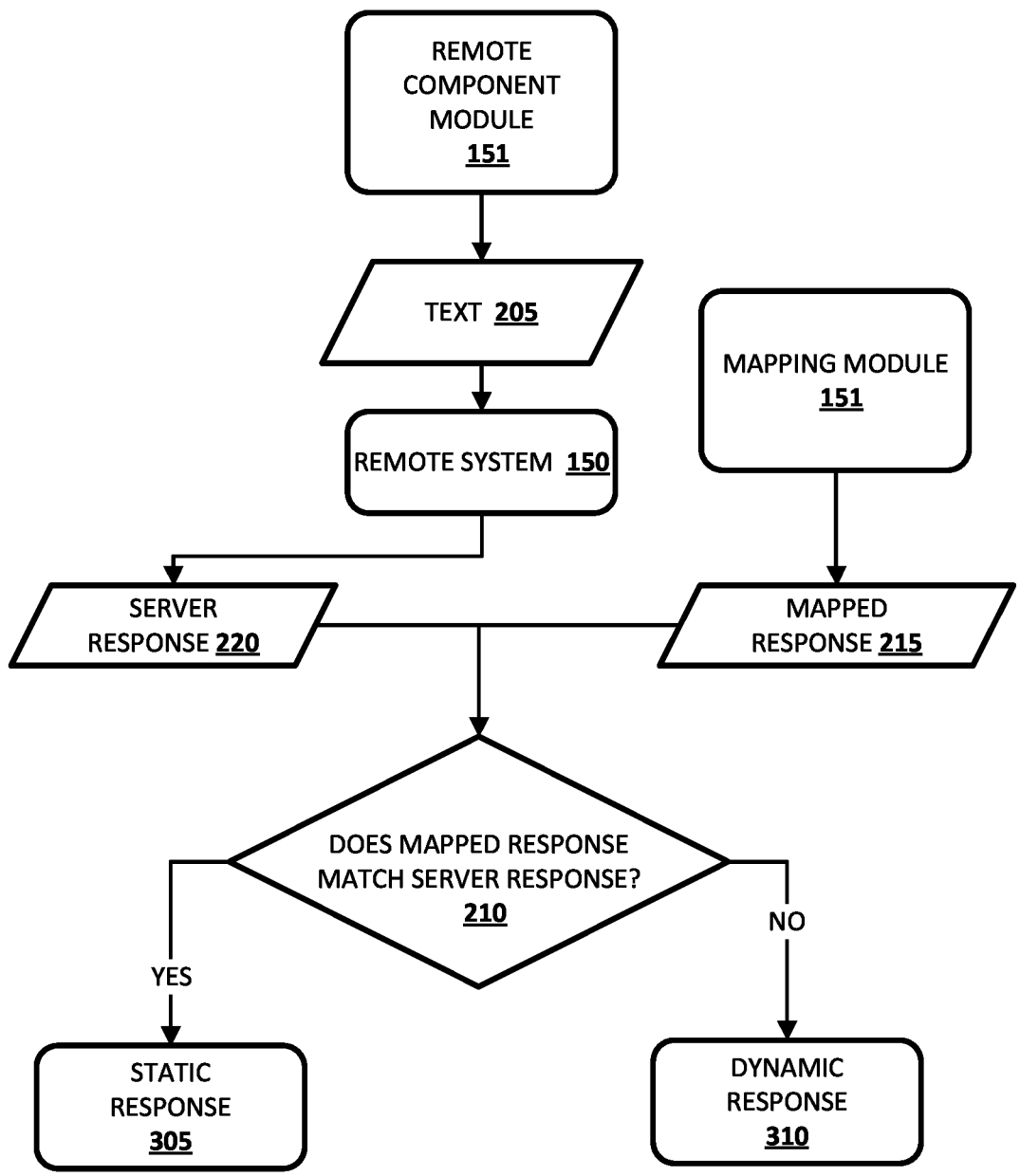
FIG. 3 is a flowchart that illustrates a method of verifying that a text-response map includes a static response for a text.

Referring to FIG. 3, a flowchart is provided that illustrates a method of verifying that the text-response map 107 includes a static response for a text. STT module 102 can provide the text 205 to the mapping module 103, which then can identify a text mapping for the text 200 and a corresponding response 205. Further, STT module can provide the text 205 (or the audio data 200) to remote component module 104, which receives a response 215 from the remote system 150. Mapping module 103 can then compare the corresponding response 215 with the server response 220 at decision 300. If the corresponding response 215 matches the server response 220, the corresponding response is more likely to be static 305 and the text mapping may be updated accordingly. However, if the corresponding response 215 does not match the server response 220, the corresponding response 215 is likely to be dynamic 310 and the text mapping for the text 205 can be updated accordingly.

In some implementations, mapping module 103 may store a confidence score with text mappings. The confidence score may be indicative of likelihood that the corresponding response is static. The confidence score can be updated each time a server response matches the corresponding response to reflect a greater likelihood that the response for the text will not change subsequently. For example, a confidence score of "1" may be assigned to a text mapping when it is first stored in the text-response map 107. Subsequently, mapping module 103 may identify the text mapping (based on a subsequent text that matches the text of the text mapping), the text (or audio data) may be provided to the remote system 150, and a server response received from the remote system may be compared to the corresponding response. If the two responses match, the confidence score for the text mapping may be updated to "2" to reflect that the same response was identified twice. As the text is processed again in subsequent submission(s) from the user, the confidence score may continue to be updated.

In some implementations, a corresponding response of a text mapping that is identified by mapping module 103 may be provided to render module 105 only if the confidence score associated with the identified text mapping satisfies a threshold. In these circumstances, the render module 105 may render the response without waiting for any further response from the remote system 150. This reduces latency. For example, mapping module 103 may identify a text mapping with a confidence score of "3," indicating that the corresponding response has been verified three times. Mapping module may only provide the corresponding text if the confidence level is greater than "2" and may provide the corresponding text. Also, for example, the mapping module 103 may not provide a corresponding response if the associated confidence of the text mapping is "1." Instead, remote component module can provide the audio data 200 and/or text 205 to the remote system 150 and the server response can be provided to the render module 105 (and to the mapping module 103 to update the confidence score as described above). If the corresponding response matches the server response, the confidence score may be updated to "2" and, when the text mapping is identified based on a subsequent utterance of the user, the corresponding response from the mapping may be provided to the render module 105 instead of the server response.

In some implementations, remote component module may provide the audio data 200 and/or text 205 to the remote system 150 only when mapping module 103 does not identify a text mapping in text-response map 107 (as previously described) or when the confidence score associated with an identified text mapping does not satisfy a threshold. For example, a corresponding response for a text mapping with a confidence score of "3" may be provided to render module 105, without any communication with the remote server 150 if the confidence score satisfies a threshold. However, a corresponding response for a text mapping with an associated confidence score of "2" may be provided to the render module 105 and further, the audio data or text can be provided to the remote system 150. In these circumstances, the response from the mapping locally stored at the client device 100 may be rendered before the response from the remote system 150 is received at the client device 100. When the response from the remote system 150 is subsequently received, it may be used to iterate the confidence score or, for example, remove the stored mapping, mark the stored mapping as stale and/or to update the mapping to reflect the fact that the stored response is dynamic as described below. This depends on whether the response from the remote system 150 matches the response in the local mapping. Thus, the remote server 150 may only be accessed when a confidence score of an identified text mapping does not satisfy a threshold. Therefore, the resources of the remote server 150 are impacted only when confidence in a response stored on the client device 100 is not high enough to be assured that the text mapping includes a static response.

In some instances, the server response may not match the corresponding response of text mapping identified by mapping module 103. In those instances, mapping module 103 may update the text mapping to reflect that the stored response is dynamic. For example, mapping module 103 may update the confidence score associated with the text mapping to "−1" or some other flag to indicate that the response is stale and/or is dynamic. If the same text is subsequently generated by the STT module 102, mapping module 103 can identify the text mapping, determine that the corresponding response should not be rendered, and instead indicate to the remote component module 104 to provide the audio data and/or text to the remote server 150 for further processing. By setting the confidence score (or setting a flag) to reflect a response is dynamic ensures that, upon subsequent instances of receiving the same text, a new mapping is not stored. Thus, mapping module 103 will not repeatedly expend computational resources continuously adding text mappings that will not ever be utilized to render content to the user. However, in some implementations, mapping module 103 may remove the text mapping entirely to preserve storage space.

In some implementations, remote system 150 may provide an indication of whether a server response is dynamic or static. In some instances, agent module 153 may determine an indication to provide to the client device 100 based on the agent 190 to which the agent module 153 provided the action based on the received audio data and/or text. For example, agent module 153 may determine that the action should be provided to a weather agent to determine the weather for a particular day. Further, agent module 153 may determine that responses from the weather agent are dynamic and provide an indication that the server response provided to the client device 100 is dynamic. Based on receiving an indication that the server response is dynamic, mapping module 103 may not store the server response with the text in the text-response map 107 and/or may store an indication with the text mapping indicating that the response is dynamic and should not be served from the text-response map 107 upon subsequent processing of the text. As another example, agent module 153 may determine that a knowledge graph agent should process the annotated text and provide an indication that the knowledge graph utilized by the component is static and that mapping module 103 should store the text mapping (i.e., the text with the server response) for future utilization when the same spoken utterance is captured.

In some implementations, remote system 150 may provide an indication of how long a server response is static. For example, agent module 153 and/or one or more other components of the remote system 150 may determine, once processed, that an utterance of "What is the weather like tomorrow" can result in a static response until midnight and then will be different after midnight (i.e., when the definition of "tomorrow" changes to a different day). Also, for example, an utterance of "Who do the Cubs play next" may be provided with an indication of the time of the next Cubs game and that the response will change after the Cubs have played their next game. Also, for example, an utterance of "Find restaurants near me" may result in a static response only when the user has not changed locations and/or has not moved more than a threshold distance between providing the utterances. Mapping module 103 may then check to determine whether an expiration event stored with the text mapping has occurred before providing the corresponding response to the render module 105.

In some implementations, mapping module 103 may periodically remove text mappings from the text-response map 107 to ensure that the stored responses are still fresh and/or to prevent the text-response map 107 from growing in storage space requirements beyond the capabilities of the client device 100. For example, mapping module 103 may utilize a "first in, first out" approach and remove older text mappings that have not been accessed when new text mappings are added (e.g., only keep the last X number of accessed mappings and remove the one accessed the longest time ago when a new mapping is added and the text-response includes X text mappings). In some implementations, mapping module 103 may remove text mappings stored with an expiration event when the event occurs. For example, mapping module 103 may periodically check expiration events stored in the text-response map 107 and remove any text mappings with expiration events that have already occurred. In some implementations, mapping module 103 may periodically remove any text mappings that have been flagged as dynamic.

Figure 4:
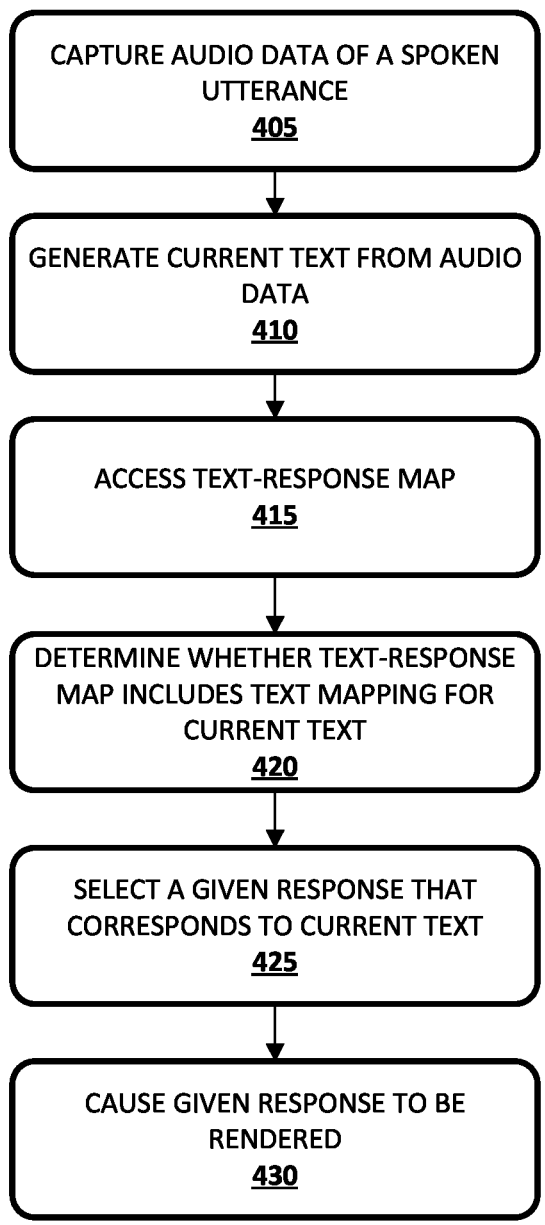
FIG. 4 illustrates a flowchart of an example method according to implementations disclosed herein.

FIG. 4 illustrates a flowchart of an example method according to implementations disclosed herein. One or more steps may be omitted, performed in a different order, and/or one or more additional steps may be included in various implementations.

At step 405, audio data is captured that is indicative of a spoken utterance of a user. The spoken utterance may be captured by one or more components of a client device that shares one or more characteristics with microphone 106 of client device 100. In some implementations, portions of the spoken utterance may be captured before the user has completed the spoken utterance and the portions may be provided to one or more other components while still capturing additional audio data. For example, microphone 106 may capture a portion of audio data and provide the audio data to one or more components while continuing to capture additional audio data of the spoken utterance.

At step 410, a current text is generated from the audio data. The current text may be generated by a component that shares one or more characteristics with STT module 102. In some implementations, STT module 102 may receive a portion of the audio data and begin generating the current text before the entirety of the audio data for the spoken utterance has been received from, for example, microphone 106. In some implementations, STT module 102 may wait until all audio data of a spoken utterance has been provided before generating the current text. Further, STT module 102 may perform some normalization of the text to, for example, remove filler words, conjugate verbs to a standard conjugation, and/or remove unmeaningful portions of the text. However, STT module 102 is intended to be less computationally intensive than, for example, a STT module executing on a server. Thus, STT module 102 may perform little more than conversion of the audio data to text.

At step 415, a text-response map is accessed. The text-response map may share one or more characteristics with text-response map 107 and may be accessed by a component that shares one or more characteristics with mapping module 103. The text-response map includes text mappings, each of which includes a text with a direct relationship to a corresponding response. The text mappings in the text-response map may be generated based on previous spoken utterances of the user and responses received from a remote system in response to submitting the audio data and/or text generated in response to capturing the audio data of the user speaking an utterance.

At step 420, the text-response map is checked to determine whether the current text is included in a text mapping. For example, a component sharing one or more characteristics with mapping module 103 may access the text-response map and determine whether the text of any of the text mappings includes the current text. In some implementations, mapping module 103 may require an exact match between the text of a text mapping and the current text. In some implementations, mapping module 103 may identify a close match to the current text. However, because the mapping module 103 is executing on a client device of the user and may be resource-constrained, mapping module 103 may not identify a given text in the text-response map as matching the current text unless the match is exact or the texts vary minimally.

At step 425, once a text mapping with a text that matches the current text has been identified in the text-response map, the corresponding response for that text mapping is selected. The corresponding response for a given text may have been previously generated and stored in the text-response map based on the given text (or audio data associated with the given text) being submitted to a remote system and receiving the corresponding response from the remote server. In some implementations, a confidence score may be associated with the text mapping and the corresponding response may be selected only if the confidence score satisfies a threshold. The confidence score may be determined based on, for example, the number of times the given text has been submitted to a remote system and the corresponding response being received from the remote system. Thus, as a given text (or audio data for the given text) is provided to the remote system for processing with the same resulting response, the greater the confidence that the corresponding response is valid.

At step 430, one or more components causes the response from the identified text mapping to be rendered. The response may be rendered by a component that shares one or more characteristics with render module 105. In some implementations, render module 103 may be in communication with one or more other components, such as a text-to-speech module which converts the response into speech and provides the speech to user via one or more speakers. Also, for example, render module 105 may be in communication with one or more other interfaces, such as a visual interface, and rendering may include providing visual output to the user via the visual interface. Also, for example, render module 103 may be in communication with one or more other devices of the user, such as a lighting fixture that is Wi-fi enabled, and cause the device to perform one or more actions (e.g., turning off a particular light).

Figure 5:
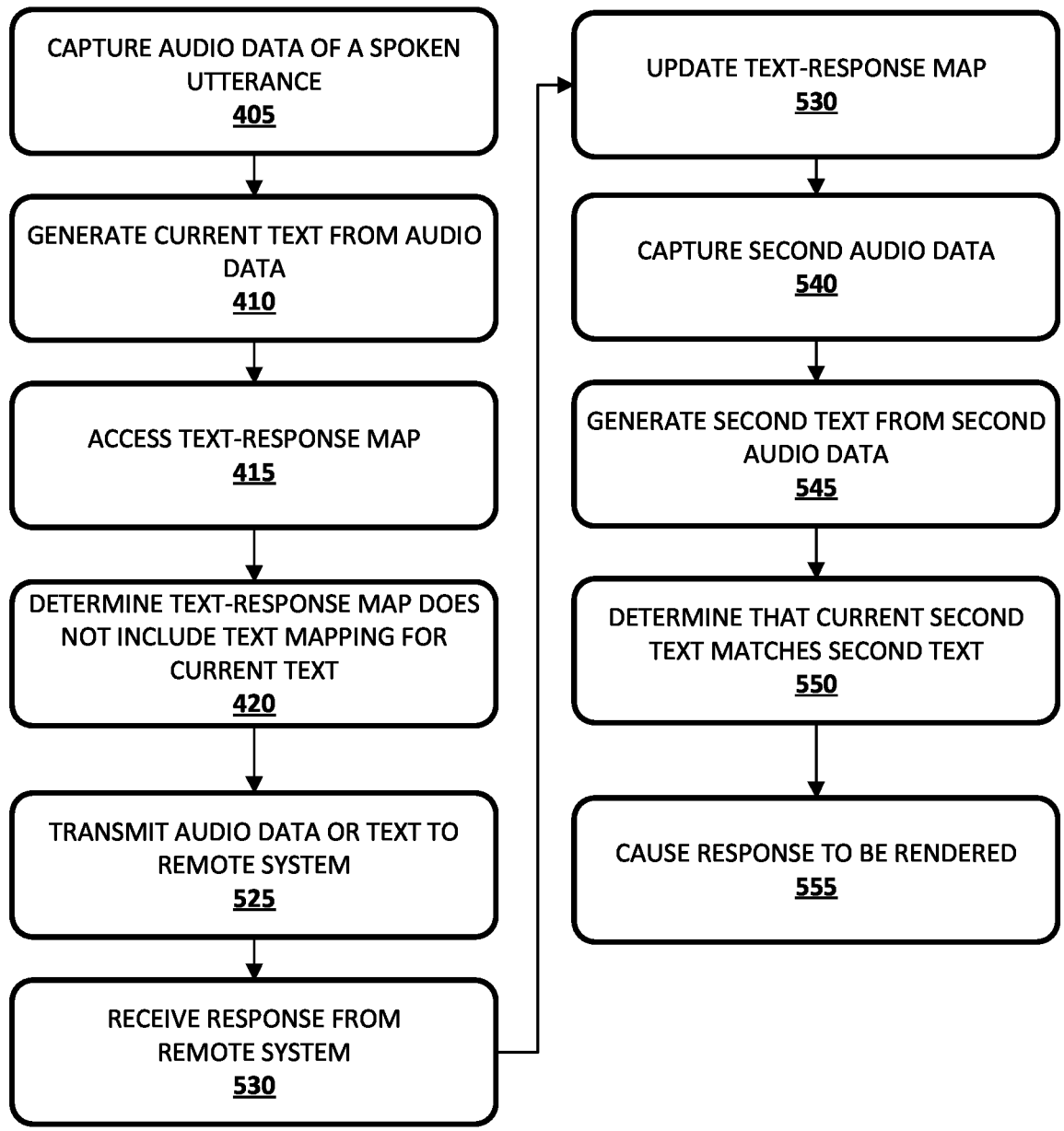
FIG. 5 illustrates a flowchart of another example method according to implementations disclosed herein.

FIG. 5 illustrates a flowchart of another example method according to implementations disclosed herein. One or more steps may be omitted, performed in a different order, and/or one or more additional steps may be included in various implementations.

At step 505, one or more components captures audio data of a spoken utterance of a user. Step 505 may share one or more characteristics with step 405 of FIG. 4. For example, the audio data may be captured by a component that shares one or more characteristics with microphone 106.

At step 510, a current text is generated from the audio data. This step may share one or more characteristics with step 410 of FIG. 4. For example, a component sharing one or more characteristics with STT module 102 may generate the text based on the audio data.

At step 515, a text-response map is accessed. The text-response map may share one or more characteristics with the text-response map 107 and this step may share one or more characteristics with step 415 of FIG. 4. For example, mapping module 103 may access the text-response map 107 to determine whether the current text is included in a text mapping in the text-response map 107.

At step 520, one or more components determines that the text-response map does not include a text mapping with a text that matches the current text. The determination may be performed by a component that shares one or more characteristics with mapping module 103 in text-response map 107. For example, mapping module 107 may access the text-response map and check the stored texts in the map and determine that none of the text mappings match the current text, none of the text mappings that match have a confidence score indicative of valid data, and/or any matching text mappings have expired, as described herein.

At step 525, the captured audio data and/or the current text are provided to a remote system. The remote system may share one or more characteristics with remote system 159. For example, a remote component module 104 may provide the audio data and/or text to remote system 150 for further processing, as described herein. The remote system 150 may then determine a response for the audio data and/or current text.

At step 530, the response is then provided by the remote system to the client device. In some implementations, the response may be received with an indication of the agent utilized by the remote system to generate the response. In some implementations, the response may be received with an indication of whether the response is static. If instead the response is received with an indication that the response is dynamic, the response may be rendered but not stored in the text-response map according to the remaining steps of the method of FIG. 5.

At step 535, the text-response map is updated. Updating the text-response map may include generating a new text mapping that includes the current text mapped to the server response. In some implementations, updating the text-response map may include storing a confidence score with the new text mapping and/or an indication received with the response (e.g., whether the response is static or dynamic, the agent utilized to generate the response).

At step 540, second audio data is captured. Step 540 may share one or more characteristics with step 505 and/or step 405 of FIG. 4.

At step 545, a second text is generated from the second audio data. Step 545 may share one or more characteristics with step 510 and/or step 410 of FIG. 4.

At step 550, one or more components determines that the current text matches the second text. This may be determined by a component that shares one or more characteristics with mapping module 103 and can share one or more characteristics with step 420 of FIG. 4. For example, mapping module 103 may determine that the text of the text mapping stored in the text-response mapping at step 535 matches the second text.

At step 555, one or more components causes the response to be rendered. This step may share one or more characteristics with step 430 of FIG. 4. For example, a component sharing one or more characteristics with render module 105 can cause the response to be rendered. Optionally, the rendering of the response may occur without the second audio data or data representing the second audio data being sent to the remote system 150.

Figure 6:
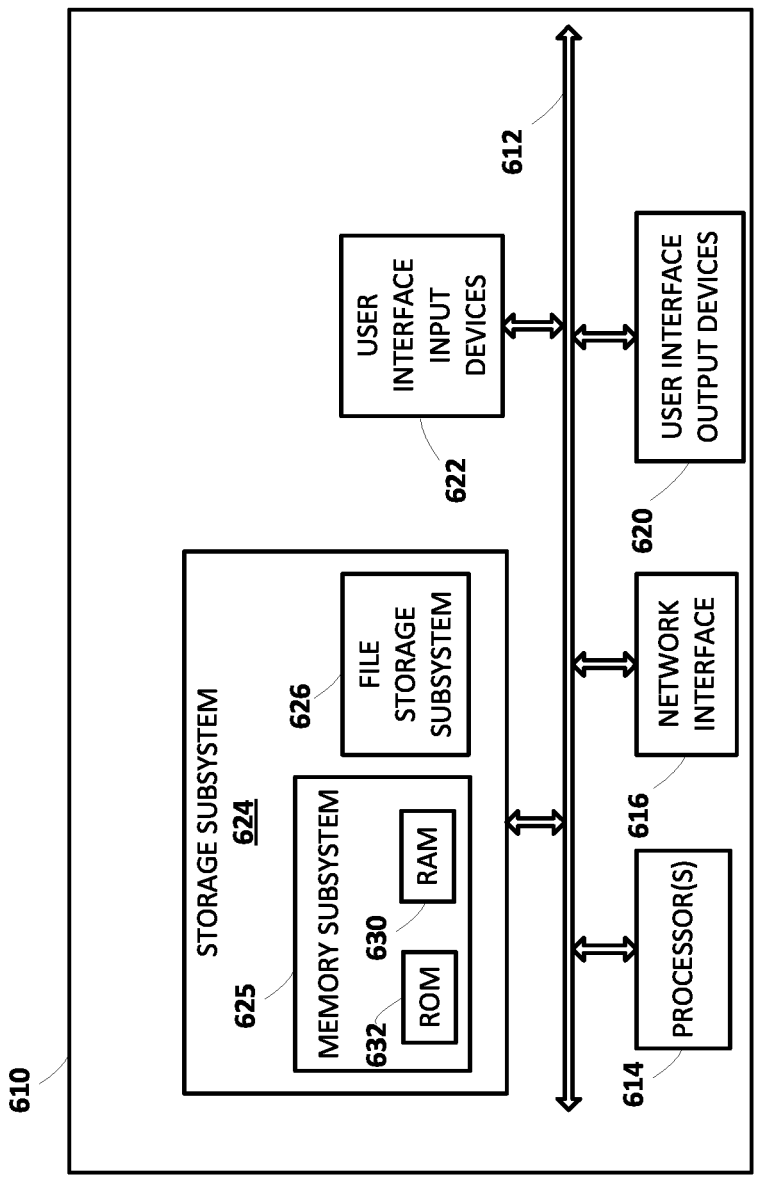
FIG. 6 is a block diagram of an example computing device that may optionally be utilized to perform one or more aspects of techniques described herein.

FIG. 6 is a block diagram of an example computing device 610 that may optionally be utilized to perform one or more aspects of techniques described herein. For example, client device 100 can include one or more components of example computing device 610 and/or one or more remote systems 150 can include one or more components of example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 2-5, and/or to implement various components depicted in FIGS. 1-3.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A method implemented by one or more processors of a client device, the method comprising:

capturing, via at least one microphone of the client device, audio data that captures a spoken utterance of a user;

processing the audio data to generate current text that corresponds to the spoken utterance, wherein processing the audio data to generate the current text utilizes a voice-to-text model stored locally on the client device;

accessing a text-response map stored locally on the client device, wherein the text-response map includes a plurality of mappings, each of the mappings defining a corresponding direct relationship between corresponding text and a corresponding response based on the corresponding text being previously generated from previous audio data captured by the client device and based on the corresponding response being previously received from a remote system in response to transmitting, to the remote system, at least one of the previous audio data and the corresponding text;

determining, by the client device, that the corresponding texts of the text-response map fail to match the current text;

in response to determining that the corresponding texts of the text-response map fail to match the current text, transmitting, to a remote system and based on determining that the corresponding texts of the text-response map fail to match the current text, the audio data or the current text;

receiving, from the remote system in response to transmitting the audio data or the current text, a response and an indication that the response is static only until an expiration event occurs, wherein the expiration event comprises determining that the user is no longer present at a particular location;

updating, in response to the indication that is received from the remote system indicating that the response is static, the text-response map by adding a given text mapping and including an indication of the expiration event with the given text mapping, the given text mapping defining a direct relationship between the current text and the response;

capturing, subsequent to updating the text-response map, second audio data;

processing the second audio data to generate a second text utilizing the voice-to-text model stored locally on the client device;

determining, based on the text-response map, that the current text matches the second text;

in response to determining that the current text matches the second text, and based on the text-response map including the given text mapping that defines the direct relationship between the current text and the response:
causing the response, from the text-response map, to be implemented; and removing the given text mapping from the text-response map when the expiration event occurs.

2. The method of claim 1, wherein the spoken utterance comprise a query or command and the response comprises a response to the query or command.

3. The method of claim 2, wherein the response comprises information indicated to be of interest in the query or command.

4. The method of claim 1, wherein updating the text-response map includes removing one or more mappings from the text-response map.

5. The method of claim 1, wherein causing the response to be implemented comprises causing the client device to render the response.

6. The method of claim 1, wherein the response comprises a command and wherein causing the response to be implemented comprises causing the command to be provided to a smart device to alter a state of the smart device.

7. A client device comprising:
one or more processors;
microphones; and
memory storing computer-executable instructions which, when executed by the one or more processors, causes the one or more processors to:
capture, via at least one of the microphones, audio data that captures a spoken utterance of a user;
process the audio data to generate current text that corresponds to the spoken utterance, wherein processing the audio data to generate the current text utilizes a voice-to-text model stored locally on the client device;
access a text-response map stored locally on the client device, wherein the text-response map includes a plurality of mappings, each of the mappings defining a corresponding direct relationship between corresponding text and a corresponding response based on the corresponding text being previously generated from previous audio data captured by the client device and based on the corresponding response being previously received from a remote system in response to transmitting, to the remote system, at least one of the previous audio data and the corresponding text;
determine, by the client device, that the corresponding texts of the text-response map fail to match the current text;
in response to determining that the corresponding texts of the text-response map fail to match the current text, transmit, to a remote system and based on determining that the corresponding texts of the text-response map fail to match the current text, the audio data or the current text;
receive, from the remote system in response to transmitting the audio data or the current text, a response and an indication that the response is static only until an expiration event occurs, wherein the expiration event comprises determining that the user is no longer present at a particular location;
update, in response to the indication that is received from the remote system indicating that the response is static, the text-response map by adding a given text mapping and including an indication of the expiration event with the given text mapping, the given text mapping defining a direct relationship between the current text and the response;
capture, subsequent to updating the text-response map, second audio data;
process the second audio data to generate a second text utilizing the voice-to-text model stored locally on the client device;
determine, based on the text-response map, that the current text matches the second text;
in response to determining that the current text matches the second text, and based on the text-response map including the given text mapping that defines the direct relationship between the current text and the response:
cause the response, from the text-response map, to be implemented; and
remove the given text mapping from the text-response map when the expiration event occurs.

8. The client device of claim 7, wherein the spoken utterance comprises a query or command and the response comprises a response to the query or command.

9. The client device of claim 8, wherein the response comprises information indicated to be of interest in the query or command.

10. The client device of claim 7, wherein in updating the text-response map, one or more of the processors are to remove one or more mappings from the text-response map.

11. The client device of claim 7, wherein in causing the response to be implemented, one or more of the processors are to cause the client device to render the response.

12. The client device of claim 7, wherein the response comprises a command and wherein in causing the response to be implemented, one or more of the processors are to cause the command to be provided to a smart device to alter a state of the smart device.

13. A non-transitory computer readable storage medium configured to store instructions that, when executed by one or more processors, cause one or more of the processors to:
capture, via at least one microphone of a client device, audio data that captures a spoken utterance of a user;
process the audio data to generate current text that corresponds to the spoken utterance, wherein processing the audio data to generate the current text utilizes a voice-to-text model stored locally on the client device;
access a text-response map stored locally on the client device, wherein the text-response map includes a plurality of mappings, each of the mappings defining a corresponding direct relationship between corresponding text and a corresponding response based on the corresponding text being previously generated from previous audio data captured by the client device and based on the corresponding response being previously received from a remote system in response to transmitting, to the remote system, at least one of the previous audio data and the corresponding text;
determine, by the client device, that the corresponding texts of the text-response map fail to match the current text;
in response to determining that the corresponding texts of the text-response map fail to match the current text, transmit, to a remote system and based on determining that the corresponding texts of the text-response map fail to match the current text, the audio data or the current text;
receive, from the remote system in response to transmitting the audio data or the current text, a response and an indication that the response is static only until an expiration event occurs, wherein the expiration event comprises determining that the user is no longer present at a particular location;
update, in response to the indication that is received from the remote system indicating that the response is static, the text-response map by adding a given text mapping and including an indication of the expiration event with the given text mapping, the given text mapping defining a direct relationship between the current text and the response;

capture, subsequent to updating the text-response map, second audio data;

process the second audio data to generate a second text utilizing the voice-to-text model stored locally on the client device;

determine, based on the text-response map, that the current text matches the second text;

in response to determining that the current text matches the second text, and based on the text-response map including the given text mapping that defines the direct relationship between the current text and the response:

cause the response, from the text-response map, to be implemented; and remove the given text mapping from the text-response map when the expiration event occurs.

14. The non-transitory computer readable storage medium of claim 13, wherein the spoken utterance comprises a query or command and the response comprises a response to the query or command.

15. The non-transitory computer readable storage medium of claim 14, wherein the response comprises information indicated to be of interest in the query or command.

16. The non-transitory computer readable storage medium of claim 13, wherein in updating the text-response map, one or more of the processors are to remove one or more mappings from the text-response map.

17. The non-transitory computer readable storage medium of claim 13, wherein in causing the response to be implemented, one or more of the processors are to cause the client device to render the response.

18. The non-transitory computer readable storage medium of claim 13, wherein the response comprises a command and wherein in causing the response to be implemented, one or more of the processors are to cause the command to be provided to a smart device to alter a state of the smart device.

* * * * *